United States Patent [19]

Kommineni

[11] 4,374,298

[45] Feb. 15, 1983

[54] SEMI-FLEXIBLE GAS-INSULATED TRANSMISSION LINE USING SANDWICHED DISCS FOR INTERMITTENT FLEXING JOINTS

[75] Inventor: Prasad R. Kommineni, Westboro, Mass.

[73] Assignee: Westinghouse Electric Corp., Pittsburgh, Pa.

[21] Appl. No.: 361,211

[22] Filed: Mar. 24, 1982

[51] Int. Cl.³ .................... H01B 9/06; H01B 9/04; H02G 5/06
[52] U.S. Cl. .................................. 174/21 C; 174/28
[58] Field of Search ............ 174/16 B, 21 C, 21 C A, 174/22 C, 28, 99 B, 99 E Primary Examiner—Laramie E. Askin
Attorney, Agent, or Firm—M. S. Yatsko

[57] ABSTRACT

A gas-insulated transmission line includes an outer sheath, an inner conductor, an insulating gas electrically insulating the inner conductor from the outer sheath, and insulating supports insulatably supporting the inner conductor within the outer sheath. The inner conductor is provided with flexibility by the use of main conductor sections which are joined together through a conductor hub section and flexible flexing elements. Stress shields are provided to control the electric field at the locations of the conductor hub sections where the insulating supports are contacting the inner conductor.

The flexing elements are formed by sandwiching together, by fusing, a pair of thin hollow discs which are fixedly secured to both the main conductor sections and the conductor hub section.

4 Claims, 4 Drawing Figures

2

SEMI-FLEXIBLE GAS-INSULATED TRANSMISSION LINE USING SANDWICHED DISCS FOR INTERMITTENT FLEXING JOINTS

GOVERNMENT RIGHTS STATEMENT

The Government has rights in this invention pursuant to Contract No. DE-AC-O1-78-ET-29046 awarded by the United States Department of Energy.

CROSS-REFERENCE TO RELATED APPLICATION

Reference is made to a copending application by Alan H. Cookson et al. entitled "Semi-Flexible Gas-Insulated Transmission Line Using Electric Field Stress Shields", Ser. No. 298,691, filed Sept. 2, 1981, and initially assigned to the same original assignee as the present application.

BACKGROUND OF THE INVENTION

This invention relates generally to gas-insulated electrical apparatus, and more particularly to a semi-flexible gas-insulated transmission line which utilizes sandwiched discs to provide intermittent flexing joints along the transmission line.

Prior art gas-insulated transmission lines typically comprise a hollow, rigid elongated outer sheath at low or ground electrical potential, with a rigid inner conductor disposed within the outer sheath for carrying the electric current. Insulating supports are utilized for supporting the inner conductor within the outer sheath, and an insulating gas, typical of which is sulfur hexafluoride, is utilized for electrically insulating the high potential inner conductor from the grounded outer sheath.

One disadvantage which exists with the present gas-insulated transmission line is the inability of the lines to change direction easily. The present lines are composed of straight sections generally 30–60 feet in length, and changes in direction must be accomplished by fabricating a shorter line section and utilizing elbow sections, or their equivalent, to accomplish the change in direction. It therefore would be advantageous to manufacture and utilize a gas-insulated transmission line which can more readily accommodate changes in line direction.

SUMMARY OF THE INVENTION

In accordance with this invention, there is provided a gas-insulated transmission line which includes an elongated outer sheath with an elongated inner conductor disposed within said outer sheath. The inner conductor is comprised of a pair of longitudinally spaced apart cylindrical main conductor sections both of which have the same diameter and have ends facing one another. A flexing element is fixedly secured to each main conductor section end, which flexing element extends radially inwardly from the main conductor section end. A cylindrical conductor hub section, having a diameter less than the diameter of the main conductor section, is fixedly secured to both flexing elements to thereby provide electrical continuity between the two main conductor sections. An insulating gas is utilized for electrically insulating the inner conductor from the outer sheath, and means are provided for insulatably supporting the inner conductor within the outer sheath.

BRIEF DESCRIPTION OF THE DRAWINGS

Reference is now made to the description of the preferred embodiments, illustrated in the accompanying drawings, in which.

DESCRIPTION OF THE PREFERRED EMBODIMENT

Figure 1:
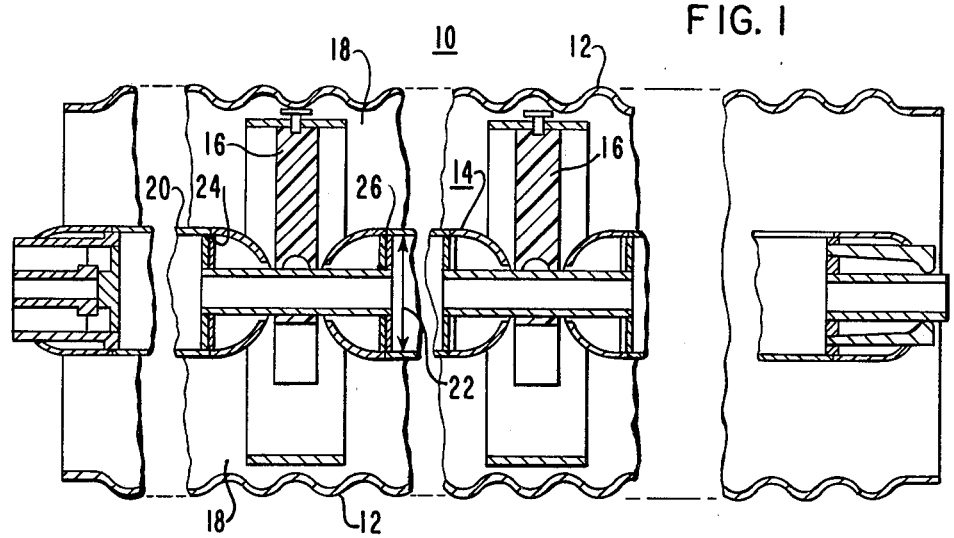
FIG. 1 is a view, in section, of a gas-insulated transmission line utilizing the teachings of this invention.

Referring now more particularly to FIG. 1, therein is illustrated a compressed gas-insulated transmission line 10 illustrating the teachings of this invention. The transmission line 10 is comprised of an elongated outer sheath 12 which is corrugated to provide flexibility, and an elongated, generally cylindrical inner conductor 14 disposed within the outer sheath. A plurality of spaced insulating supports 16 are utilized for insulatably supporting the inner conductor 14 within the outer sheath 12, and an insulating gas 18, typical of which is sulfur hexafluoride at pressures of 50 pounds/square inch gauge, is used for electrically insulating the inner conductor 14 from the outer sheath 12.

Figure 2:
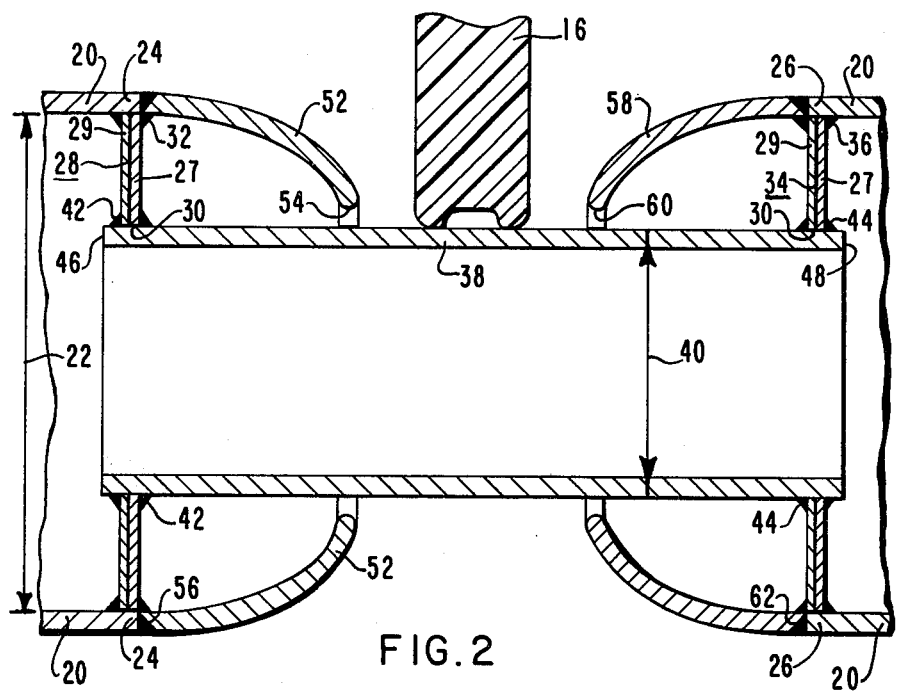
FIG. 2 is a detailed sectional view of the transmission line showing the connection of the flexing elements.

The inner conductor 14 is comprised of longitudinally spaced apart cylindrical main conductor sections 20 which each have the same inner diameter 22 and which have facing ends 24, 26 (see FIGS. 2). A flexing element 28, with an opening 30 therethrough, is fixedly secured, by means such as the weld 32, to the conductor end 24, and a similar flexing element 34 with an opening 30 is fixedly secured, by means such as the weld 36, to the conductor end 26. As shown, each flexing element 28, 34 extends radially inwardly from the main conductor section end 24, 26, respectively, to which it is secured.

Figures 3, 4:
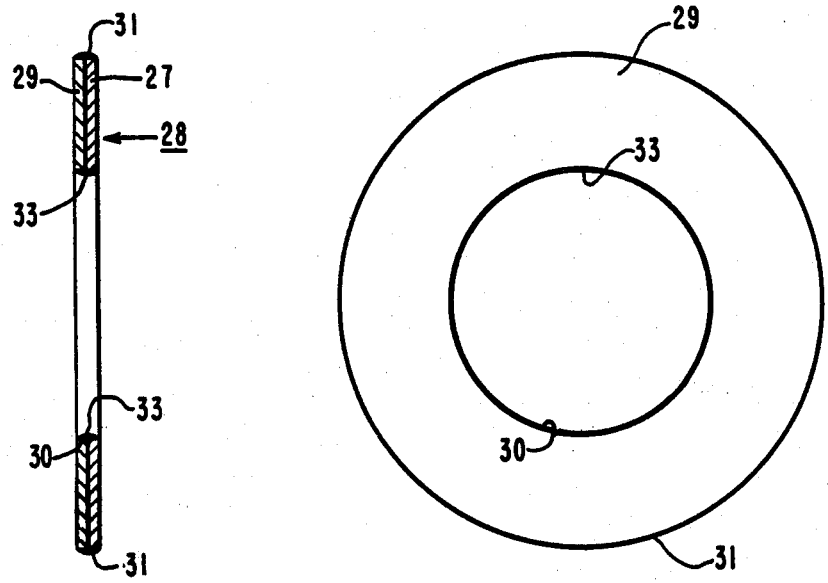
FIG. 3 is a detailed sectional view of the sandwiched thin hollow discs utilized as the flexing elements in the transmission line.
FIG. 4 is a plan view illustrating one of the hollow discs.

Referring now more particularly to FIGS. 3 and 4, therein it can be seen that the flexing element 28 (and each other flexing element) is comprised of a pair of thin, hollow flat discs 27, 29 which are sandwiched together by fusing. For example, the discs 27, 29 are fused together at their outside diameter by means of the fusion weld 31, and are fused together on their inside diameter, at the opening 30 by the fusion weld 33. The discs 27, 29 are preferably made of a thin, flexible material such as aluminum.

The required flexibility of the conductor 14 system is achieved by bending these discs 27, 29. The sandwiched discs 27, 29 carry current more efficiently because their surface area is increased over that present in a single, thicker disc, thus reducing losses. Sandwiching the thin discs 27, 29 improves the mechanical strength of the flexing element 28, and because the discs 27, 29 are fused only on the inside and outside diameters, they are more flexible than a single disc of comparable thickness.

A cylindrical conductor hub section 38, which has an outer diameter 40 less than the inner diameter 22 of the main conductor sections 20, is fixedly secured to the two flexing elements 28, 34 by means such as the welds 42, 44 adjacent the ends 46, 48 of the conductor hub section 38. By being so located, the conductor hub section 38 extends through the openings 30 of the flat sandwiched discs 27, 29.

A curved stress shield 52 having an opening 54 formed therein is fixedly secured, by means such as the weld 56 to the conductor end 24, and a similar stress shield 58, with its opening 60, is secured by means such as the weld 62 to the conductor end 26. When assembled, the conductor hub section 38 extends through the stress shield openings 54, 60, although the stress shields 52, 58 are both spaced apart from the conductor hub section 38. The stress shields 52, 58 extend both longitudinally outwardly from, and radially inwardly from, the main conductor section ends 24, 26 to which they are respectively secured.

The inner conductor 14 (FIG. 1) is given a degree of flexibility so as to be permitted changes in angular alignment because of the presence of the flexing elements 28, 34. These flexing elements, 28, 34, which pair of flexing elements may be positioned every 6 feet for a 50-foot bending radius, are current carrying members which transfer current from the main conductor sections 20 to the smaller diameter conductor hub section 38. The stress shields 52, 58 are utilized for controlling the electric field on the insulating support 16, and at the location where the insulating support 16 contacts the conductor hub section 38.

As can be seen, the invention described herein provides an improved gas-insulated transmission line which has a degree of flexibility both on the outer sheath and with the inner conductor, and which provides adequate shielding of the inner conductor at those locations where flexing may occur.

I claim as my invention:

1. A gas-insulated transmission line comprising:
   an elongated outer sheath;
   an elongated inner conductor disposed within said outer sheath, said inner conductor comprising a pair of longitudinally spaced-apart cylindrical main conductor sections having a first diameter and facing ends, a flexing element fixedly secured to each main conductor section end and extending radially inwardly therefrom and a cylindrical conductor hub section having a second diameter less than said first diameter fixedly secured to both flexing elements adjacent the ends of said conductor hub section, each of said flexing elements comprising a pair of thin, hollow discs sandwiched together by fusing on the inside and outside diameters thereof, said conductor hub section extending through said hollow sandwiched discs;
   an insulating gas electrically insulating said inner conductor from said outer sheath; and
   means for insulatably supporting said inner conductor in said outer sheath.

2. The transmission line according to claim 1 wherein said supporting means contacts said conductor hub section intermediate and spaced-apart from said main conductor section ends.

3. The transmission line according to claim 1 wherein said thin, hollow discs are made of aluminum.

4. The transmission line according to claim 1 wherein said thin, hollow sandwiched discs are welded to said conductor hub section and said main conductor section.

* * * * *